United States Patent
Van Der Tempel

(10) Patent No.: US 10,901,090 B2
(45) Date of Patent: Jan. 26, 2021

(54) TOF CAMERA SYSTEM AND A METHOD FOR MEASURING A DISTANCE WITH THE SYSTEM

(71) Applicant: SOFTKINETIC SENSORS NV, Brussels (BE)

(72) Inventor: Ward Van Der Tempel, Keerbergen (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 636 days.

(21) Appl. No.: 15/317,367

(22) PCT Filed: Jun. 11, 2015

(86) PCT No.: PCT/EP2015/063015
§ 371 (c)(1),
(2) Date: Dec. 8, 2016

(87) PCT Pub. No.: WO2015/189311
PCT Pub. Date: Dec. 17, 2015

(65) Prior Publication Data
US 2017/0123067 A1  May 4, 2017

(30) Foreign Application Priority Data

Jun. 11, 2014 (EP) .................... 14171985

(51) Int. Cl.
*G01C 3/08* (2006.01)
*G01S 17/89* (2020.01)
(Continued)

(52) U.S. Cl.
CPC ............ *G01S 17/89* (2013.01); *G01S 7/4876* (2013.01); *G01S 7/493* (2013.01); *G01S 7/4911* (2013.01); *G01S 17/10* (2013.01); *G01S 17/46* (2013.01)

(58) Field of Classification Search
CPC ........ G01S 17/89; G01S 7/493; G01S 7/4911; G01S 7/4876; G01S 17/10; G01S 17/46; G01S 17/894
(Continued)

(56) References Cited

U.S. PATENT DOCUMENTS 8,491,135 B2 * 7/2013 Brown .................. G06F 3/0425
  250/221
9,002,511 B1 * 4/2015 Hickerson ............. G01S 17/026
  700/245
(Continued)

FOREIGN PATENT DOCUMENTS

CN 102346250 A 2/2012
CN 103608695 A 2/2014

OTHER PUBLICATIONS

Chinese Office Action for Chinese Application No. 2015800366078 dated Oct. 8, 2018.
(Continued)

*Primary Examiner* — Samantha K Abraham
(74) *Attorney, Agent, or Firm* — Wolf, Greenfield & Sacks, P.C.

(57) ABSTRACT

The invention relates to a method for measuring a distance between an object of a scene and a Time-Of-Flight camera system, and providing a depth map of the object, the Time-Of-Flight camera system comprising an illumination unit, an imaging sensor having a matrix of pixels and image processing means, the method being characterized by the following steps: modifying in a discrete way the illumination of said illumination unit in order to illuminate elementary areas of the scene with different incident intensities, respectively, for distinguishing the direct incident light beams from the indirect incident light beams; receiving onto the pixels of the matrix of the sensor the beams reflected by said elementary areas and providing the image processing
(Continued)

means with corresponding data; processing the said corresponding data for eliminating the influence of the indirect light beams in the depth map of the object.

12 Claims, 5 Drawing Sheets

(51) Int. Cl.
| | | |
|---|---|---|
| *G01S 7/493* | (2006.01) | |
| *G01S 7/4911* | (2020.01) | |
| *G01S 7/487* | (2006.01) | |
| *G01S 17/10* | (2020.01) | |
| *G01S 17/46* | (2006.01) | |

(58) Field of Classification Search
USPC .............................................. 356/3.01–5.15
See application file for complete search history.

(56) References Cited

U.S. PATENT DOCUMENTS

| | | | | |
|---|---|---|---|---|
| 9,462,255 | B1* | 10/2016 | Marason ................ | G01B 11/25 |
| 2004/0213463 | A1* | 10/2004 | Morrison ............... | G01B 11/25 |
| | | | | 382/210 |
| 2010/0157280 | A1* | 6/2010 | Kusevic ................ | G01S 7/4972 |
| | | | | 356/4.01 |
| 2011/0249148 | A1* | 10/2011 | Prescher ................ | G01S 17/10 |
| | | | | 348/234 |
| 2013/0088726 | A1* | 4/2013 | Goyal ................... | G01S 7/4866 |
| | | | | 356/634 |
| 2013/0148102 | A1 | 6/2013 | Oggier | |
| 2014/0049609 | A1 | 2/2014 | Wilson et al. | |
| 2014/0055771 | A1 | 2/2014 | Oggier | |
| 2014/0350836 | A1* | 11/2014 | Stettner ................. | G01S 17/931 |
| | | | | 701/301 |
| 2015/0253429 | A1* | 9/2015 | Dorrington ............. | G01S 17/89 |
| | | | | 356/5.01 |
| 2016/0178737 | A1* | 6/2016 | Lange ..................... | G01S 17/36 |
| | | | | 356/5.1 |
| 2017/0322309 | A1* | 11/2017 | Godbaz ................ | H04N 13/254 |

OTHER PUBLICATIONS

Falie D et al: "Distance errors correction for the Time of Flight (ToF) cameras", Imaging Systems and Techniques, 2008. IST 2008. IEEE International Workshop on, IEEE, Piscataway, NJ, USA, Sep. 10, 2008 (Sep. 10, 2008), pp. 123-126, XP031354709, ISBN: 978-1-4244-2496-2.

Falie D et al: "Further investigations on ToF cameras distance errors and their corrections", Circuits and Systems for Communications, 2008. ECCSC 2008. 4th European Conference on, IEEE, Piscataway, NJ, USA, Jul. 10, 2008 (Jul. 10, 2008), pp. 197-200, XP031315023, ISBN: 978-1-4244-2419-1.

International Search Report and Written Opinion for International Application No. PCT/EP2015/063015 dated Jul. 27, 2015.

International Preliminary Report on Patentability for International Application No. PCT/EP2015/063015 dated Sep. 13, 2016.

* cited by examiner

TOF CAMERA SYSTEM AND A METHOD FOR MEASURING A DISTANCE WITH THE SYSTEM

CROSS-REFERENCE TO RELATED APPLICATIONS

This application is a § 371 national stage entry of International Application No. PCT/EP2015/063015, filed Jun. 11, 2015, which claims priority to European Patent Application No. 14171985.6 filed Jun. 11, 2014, the entire contents of which are incorporated herein by reference.

TECHNICAL FIELD OF THE INVENTION

The invention relates (i) to a method for measuring a distance between an object of a scene and a Time-Of-Flight camera system and (ii) to the Time-Of-Flight camera system associated therewith. In particular, the invention relates to the problem of direct and indirect reflections of light within a scene and to the errors of depth measurements induced by these multiple reflections. It should be understood that by scene is meant all the surfaces surrounding the object onto which a light beam could be directly or indirectly reflected.

BACKGROUND OF THE INVENTION

Time-Of-Flight technology (TOF) is a promising technology for depth perception. The well-known basic operational principle of a standard TOF camera system 3 is illustrated in FIG. 1. The TOF camera system 3 captures 3D images of a scene 15 by analysing the time of flight of light from a dedicated illumination unit 18 to an object. TOF camera system 3 includes a camera, for instance a matrix of pixels 1, and data processing means 4. The scene 15 is actively illuminated with a modulated light 16 at a predetermined wavelength using the dedicated illumination unit 18, for instance with some light pulses of at least one predetermined frequency. The modulated light is reflected back from objects within the scene. A lens 2 collects the reflected light 17 and forms an image of the objects onto the imaging sensor 1 of the camera. Depending on the distance of objects from the camera, a delay is experienced between the emission of the modulated light, e.g. the so called light pulses, and the reception at the camera of those reflected light pulses. Distance between reflecting objects and the camera may be determined as function of the time delay observed and the speed of light constant value.

One of the drawbacks of this technology is illustrated by FIG. 2 and is related to the so-called multipath phenomenon. A standard TOF camera system 9 is represented, comprising an illumination unit 8 for illuminating a scene 24 in multiple directions, a TOF sensor 6 for detecting the reflections of the emitted light and processing means 7 for processing the data acquired by the TOF sensor 6.

The pixels of TOF sensor 6, not represented, measure direct path 25 from the illumination unit 8 to the scene 24 and from the scene 24 back to the pixels. But secondary reflections 26 or higher order reflections can be captured as well on the same pixel and distort the perceived delay for the first direct reflection 25. The light captured by the sensor 6 can originate from both the direct path 25 and the secondary reflection 26, the depth map 27, representing the depth associated to each point of the scene, measured is thereby erroneous.

In prior art, several methods have been implemented to recover the direct component of impinging light. For instance, multiple frequency approaches have been performed, by acquiring a set of depth measurements with different modulation frequencies, but the resolution obtained remains low.

Another approach uses a set of different spatial patterns which are generated by, for example, a Digital Light Processing (DLP) projector. By creating dark and bright patches in the scene, the direct and indirect components can be separated, as the depth acquired from the black part of the pattern is created by only indirect signal originating from multipath. The different patterns are chosen in such a way that each part of the scene is captured in a black situation. Edge-effects are countered by defining the patterns with sufficient overlaps. However, the creation of these different patterns is expensive.

A solution remains to be proposed in order to retrieve only the direct component of the reflected light in the most cost-effective way, in order to perform more accurate measurements of the distances between objects of a scene and the TOF camera system.

SUMMARY OF THE INVENTION

The present invention relates to a method for measuring a distance between an object of a scene and a Time-Of-Flight camera system, and providing a depth map of the object, the Time-Of-Flight camera system comprising an illumination unit, an imaging sensor having a matrix of pixels and image processing means, the method being characterized by the following steps:

modifying in a discrete way the illumination of said illumination unit in order to illuminate elementary areas of the scene with different incident intensities, respectively, for distinguishing the direct incident light beams from the indirect incident light beams;

receiving onto the pixels of the matrix of the sensor the beams reflected by said elementary areas and providing the image processing means with corresponding data;

processing the said corresponding data for eliminating the influence of the indirect light beams in the depth map of the object.

Advantageously, when processing the data, the method could comprise a step of identifying, for instance on an intermediary depth maps but not only, peaks associated to elementary areas on which only indirect incident light beams can impinge. By identifying such peaks, the data could be processed for eliminating the influence of indirect light beams and obtaining a final accurate depth map of the scene.

The present invention also relates to a Time-Of-Flight (TOF) camera system for measuring a distance between an object of a scene and the TOF camera system, and providing a depth map of the object, the TOF camera system comprising:

an illumination unit for illuminating the scene with a modulated light;

an imaging sensor having a matrix of pixels for receiving onto the pixels of the matrix of the sensor the beams reflected by the scene;

image processing means for receiving from the imaging sensor, data corresponding to the reflected beams and for processing the said corresponding data;

characterized in that it further comprises:

patterning means for modifying in a discrete way the illumination of said illumination unit in order to illuminate elementary areas of the scene with different incident intensities, respectively, for distinguishing the direct incident light beams from the indirect incident light beams and for eliminating the influence of the indirect light beams in the depth map of the object in processing the said corresponding data.

Advantageously, the modification of the illumination is performed by masking the illumination unit in a discrete way. The patterning means could be for instance a mask avoiding direct incident light beams to impinge on some elementary areas of the scene.

More advantageously, the patterning means could comprise a series of identical pattern groups for enabling an easier processing of the data.

Other advantages and novel features of the invention will become more apparent from the following detailed description when taken in conjunction with the accompanying drawings.

BRIEF DESCRIPTION OF THE DRAWINGS

The present invention shall be better understood in light of the following description and the accompanying drawings.

Advantages and novel features of the invention will become more apparent from the following detailed description when taken in conjunction with the accompanying drawing.

DESCRIPTION OF THE INVENTION

Figure 3:
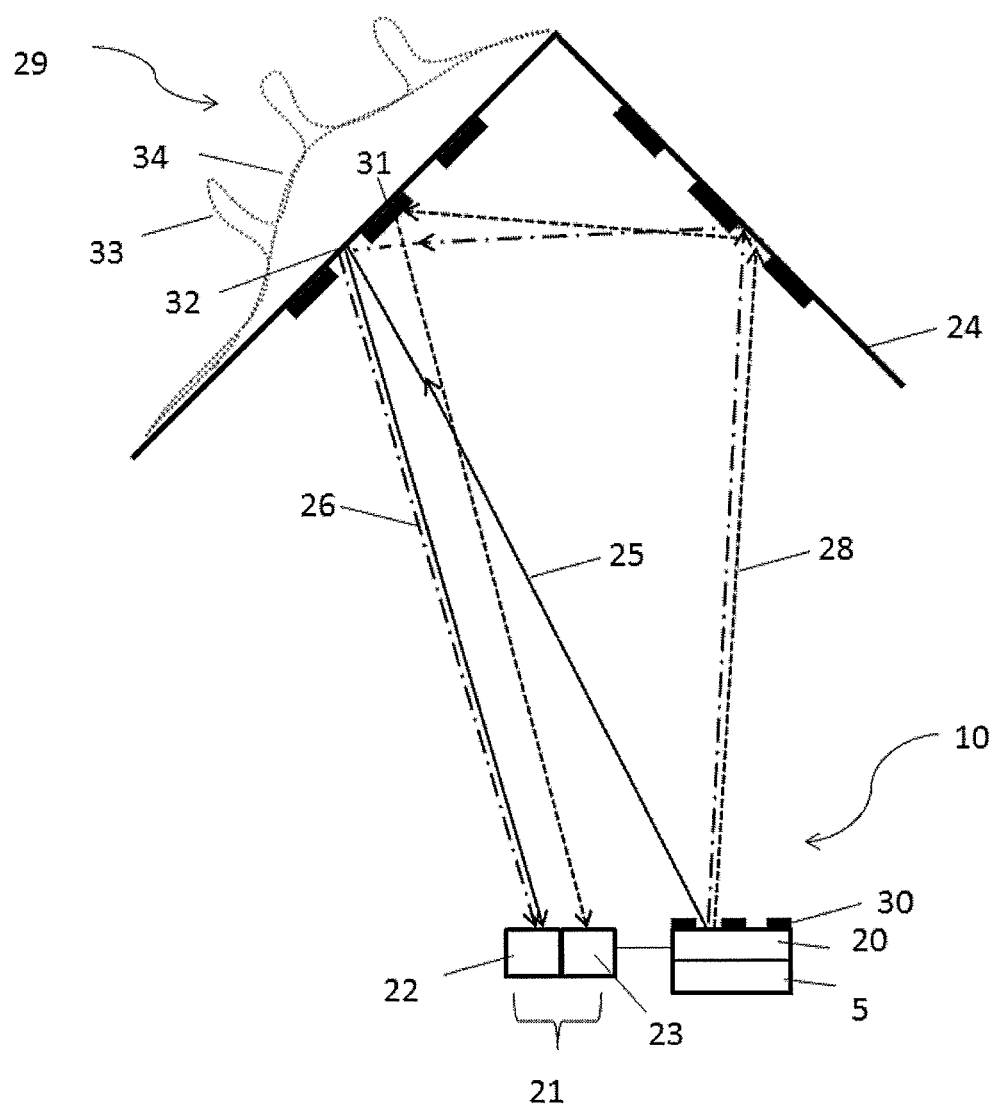
FIG. 3 illustrates a TOF camera system according to an embodiment of the invention.

FIG. 3 illustrates a TOF camera system 10 according to an embodiment of the invention. The Time-Of-Flight camera system 10 comprises an illumination unit 20 for illuminating a scene 24 with a modulated light. The light emitted by this illumination unit 20 is arranged for being suitable for measuring distances using the Time-Of-Flight technology. For instance, the illumination unit 20 may be arranged for emitting light pulses with an appropriate pulse width. Indeed, when using pulses, the pulse width of each light pulse determines the camera range. For instance, for a pulse width of 50 ns, the range is limited to 7.5 m. As a consequence, the illumination of the scene becomes critical to the operation of a TOF camera system, and the high speed driving frequency requirements for illumination units necessitate the use of specialised light sources such as light emitting diodes (LEDs) or lasers to generate such short light pulses. The illumination unit is arranged for emitting multi-directional light, as represented by the plurality of emitted light rays 25, 26 and 28 represented in FIG. 3.

The TOF camera system further comprises an imaging sensor 21 typically comprising a matrix array of pixels, for receiving and detecting the reflected beams and forming an image of the scene 24. For clarity and illustration purposes, only two pixels 22 and 23 have been represented on FIG. 3, but the invention should not be limited to a matrix of two pixels. By pixel, it should be understood the picture element sensitive to light electromagnetic radiations and its associated electronic circuitry. The output of the pixels can be used to determine the time of flight of light from the illumination unit 20 to an object in the scene 24 and reflected back from the object to the imaging TOF sensor 21.

Figure 4:
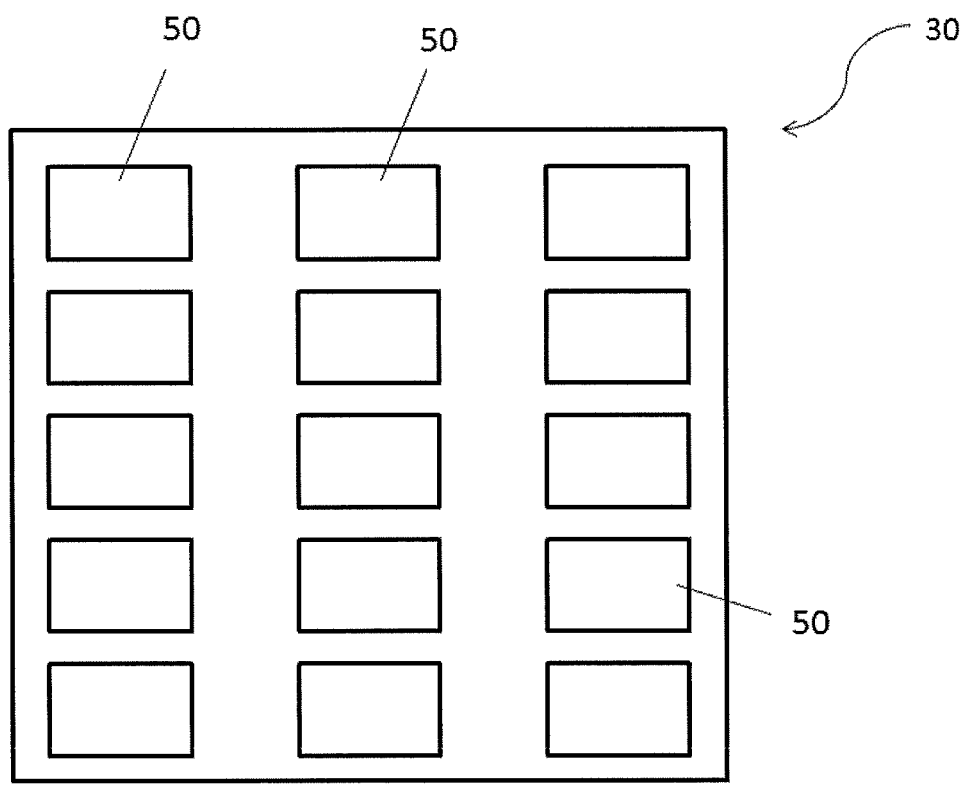
FIG. 4 illustrates an example of patterning means.

The TOF camera system 10 further comprises patterning means 30 for creating a light pattern on the scene 24. The light pattern may be a native laser speckle pattern obtained directly from laser light interferences, or be obtained from patterning means which may be placed in front of the illumination unit 20, or a combination of both the laser speckle and a patterning means 30. When using the patterning means 30, the light emitted by the illumination unit 20 passes through these patterning means, causing the light to be modified and to form a light pattern on the scene, with delimited elementary areas 31, 32 of different intensities. Prior to impinging the scene 24, the light emitted by the illumination unit 20 may be blocked or its intensity may be reduced on given areas of the patterning means 30 and not blocked on other areas, resulting in the creation of areas with low light intensity 31 and high light intensity 32, respectively, on the scene. For illustration purposes, these areas have been represented by thick lines 31 and 32, but it should be understood that the light pattern created on the scene is not a solid or a physical pattern attached on the scene 24, but the result of light effects originated from the patterning means 30 placed in front of the illumination unit 20. The light pattern is projected on the scene by the illumination unit 20. The patterning means 30 can be filtering means, a mask, a grid or any means enabling to modify in a discrete way the illumination. Ideally, the patterning means should provide a spatially periodic light pattern 31, 32, 45, 46 on the scene, for retrieving easily the areas 31 where only secondary reflections are measured. The patterning means 30 could also comprise a series of identical pattern groups 50 as represented in FIG. 4 or a series of different pattern groups that can be sequentially used in time in synchrony with a multiple of the TOF camera frame rate.

It is important to note that the invention does not require a pattern with a contrast of 100%, and that there is no need to align patterning means to the image sensor.

The TOF camera system 10 further comprises processing means 5 for determining the time of flight of light emitted by the illumination 20, and thereby, the distance between an object of the scene 24 and the imaging sensor 21. The processing means 30 are arranged for receiving data from the pixels of the imaging sensor 21 and for processing them for eliminating the influence of the indirect light beams in the depth map of the object. The method for determining this distance, and a final and accurate depth map of the object, will be described in the following paragraphs. The time of flight can be calculated in a separate processing unit which may be coupled to the TOF sensor 21 or may directly be integrated into the TOF sensor itself. In FIG. 3, the processing means 5 have been represented coupled to the illumination, unit 20, but the invention is not limited thereto.

A method for measuring a distance between an object of a scene and the Time-Of-Flight camera system and providing a depth map of the object, the Time-Of-Flight camera system 10 comprising an illumination unit 20, an imaging sensor 21 having a matrix of pixels 22, 23 and image processing means 30, will be now described, by referring to FIG. 3, FIG. 4, FIG. 5 and FIG. 6.

The method comprises the step of modifying in a discrete way the illumination of the illumination unit 20 in order to illuminate elementary areas 31, 32 of the scene with different incident intensities, respectively, for distinguishing the direct incident light beam 25 from the indirect incident light beam 26, 28. This modification can be performed for instance by creating a light pattern on a scene, the light pattern comprising delimited elementary areas with high and low light intensity. This light pattern can be created by placing the patterning means 30 in front of the illumination unit 20, and thus, projecting a light pattern on the scene.

The pixels of the sensor 21 receive the beams reflected by these elementary areas 31, 32 and provide the image processing means 30 with corresponding data.

These data are then processed for eliminating the influence of the indirect light beams and obtaining an accurate depth map of the object.

Figure 1:
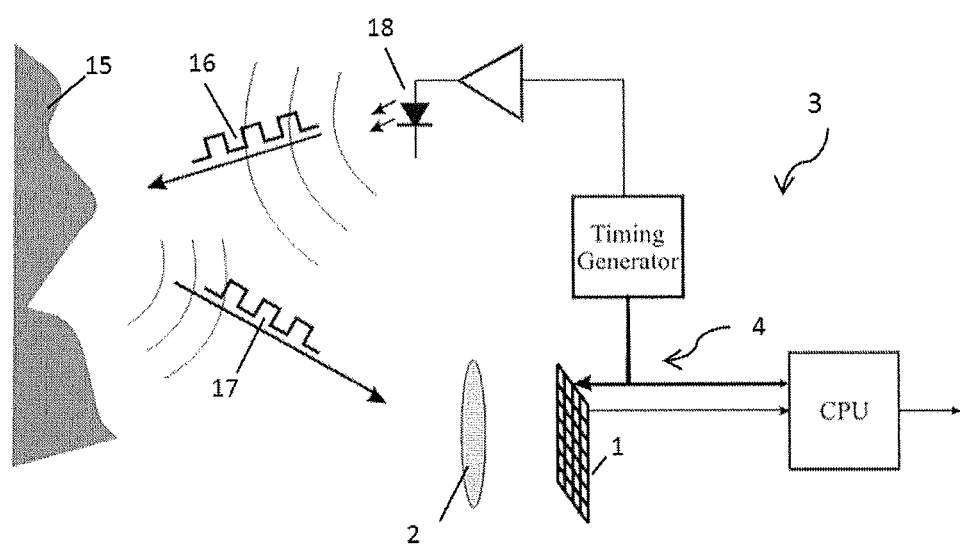
FIG. 1 illustrates the basic operational principle of a TOF camera system.
Figure 2:
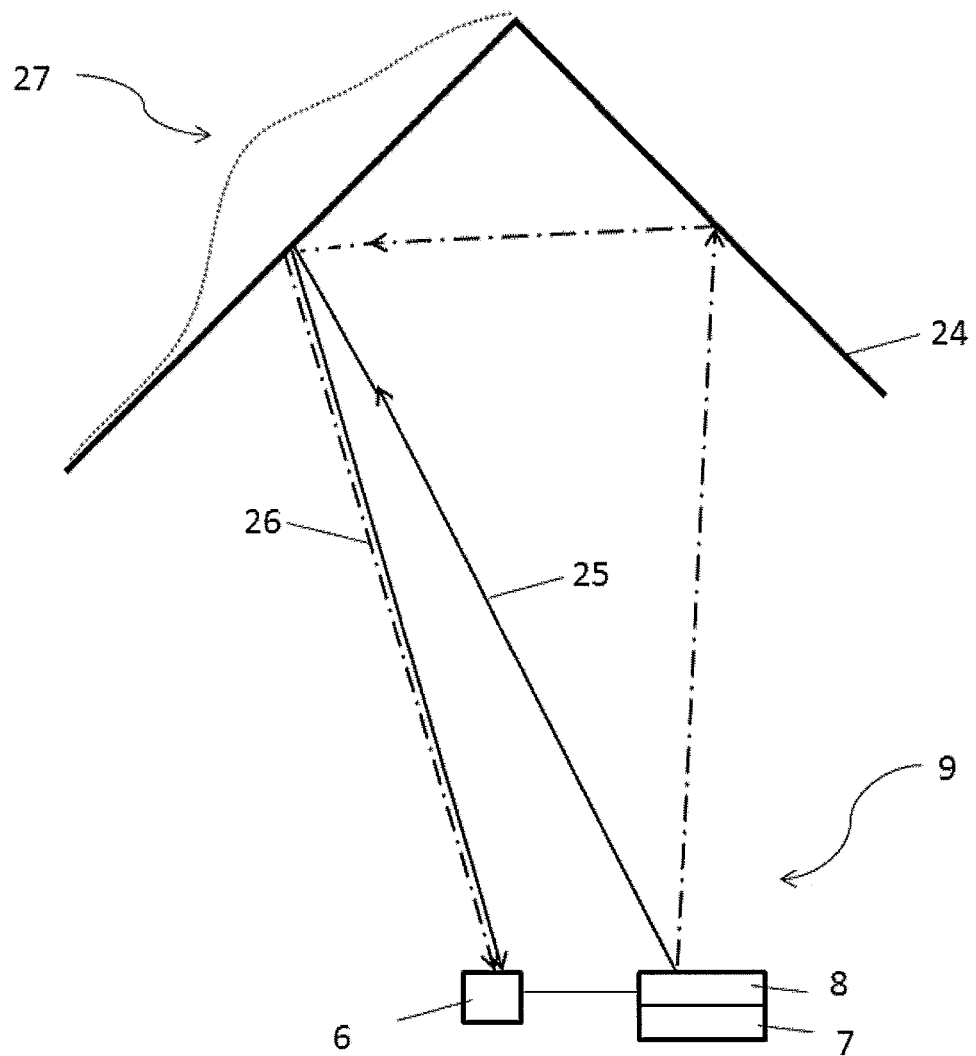
FIG. 2 illustrates the multipath phenomenon.
Figure 5:
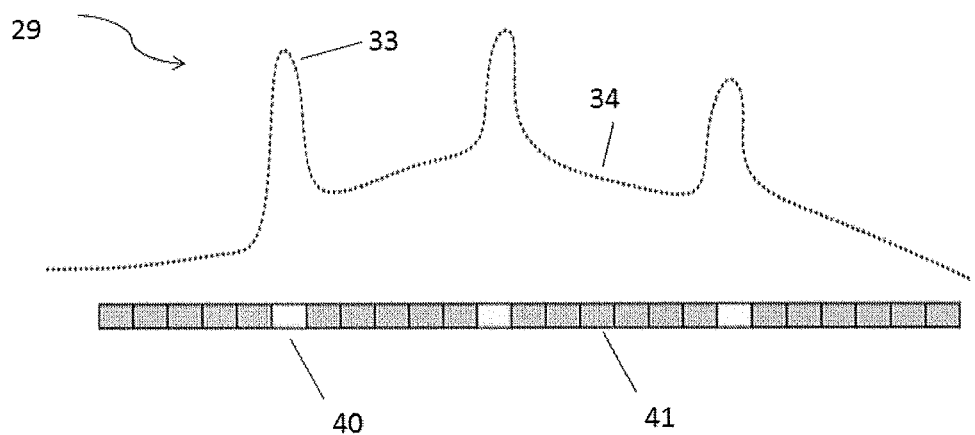
FIG. 5 illustrates an intermediary depth map of a scene and the associated pixels of the TOF camera system.
Figure 6:
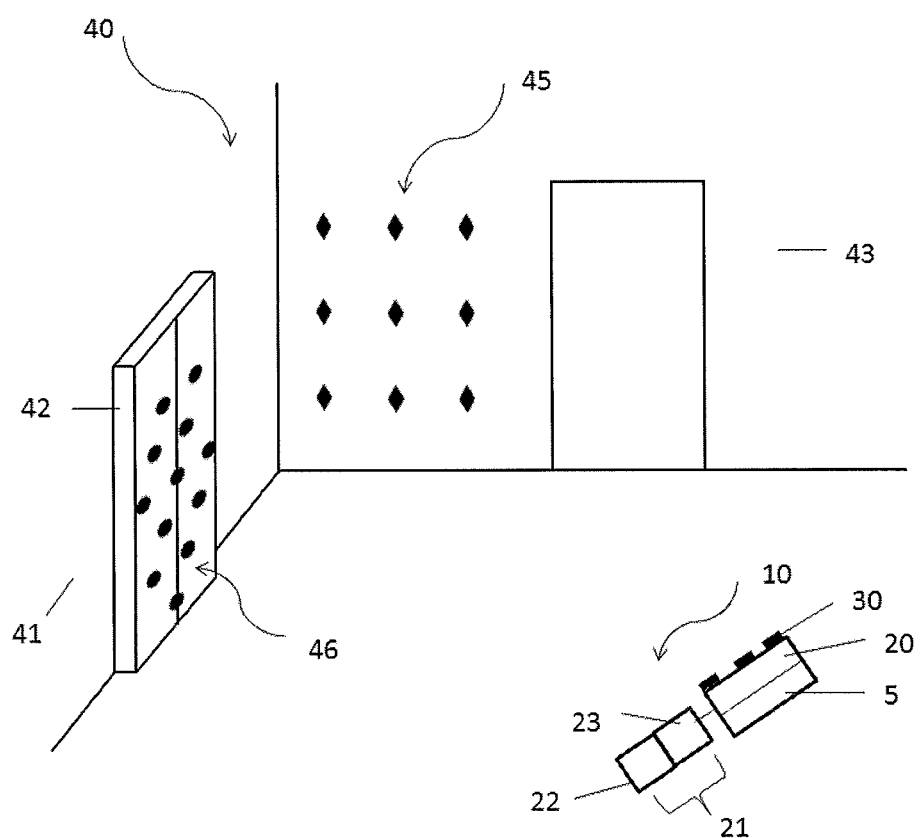
FIG. 6 illustrates a scene and a light pattern projected on the scene comprising two different spatial zones.

The light pattern projected on the scene can be retrieved on the intermediary depth map 29. This is illustrated by FIG. 3 and FIG. 5. By comparing the depth maps 27 of FIG. 2 and 29 of FIG. 3, without and with the use of the patterning means, respectively, one can notice the apparition of peaks 33. These peaks 33 correspond to areas 31 of the scene 24 where only secondary reflections are measured. Indeed, in these areas, without secondary reflection, pixels of the imaging sensor 21 should not measured light, or with a small intensity because, by definition, these areas 31 are associated to areas of the patterning means 30 where the light is blocked or where the light intensity is reduced. The light measured on pixel 23 is more dominated by the secondary reflection 28, whereas the light measured on pixel 22 corresponds to both direct and indirect components 25, 26. The fact of identifying, for instance on an intermediary depth map 29, elementary areas 31 on which no direct incident light beam can impinge can be used for eliminating the influence of indirect light beams and obtaining a final and accurate depth map of the object. The complex data obtained by the time of flight measurement of light dominated by the indirect components in pixel 23 can for example be subtracted from the complex data obtained by both direct and indirect components in pixel 22 to form a new complex data NC. If the indirect component contributions to the complex data are equal in pixel 22 and 23, the resulting complex data NC only contains information from the direct component. Even if pixel 23 still received a small direct component due to the limited contrast of the patterning means 30, the resulting complex data NC will have a smaller amplitude but will have the correct phase representing the time of flight of the direct component.

FIG. 5 illustrates an intermediary depth map of an object of the scene 29 and the associated pixels of the TOF camera system. Pixels 40 measure only indirect components and are associated to higher depth and peaks 33, whereas pixels 41 measure both direct and indirect components, and are associated to areas 34 of the depth map 29. The identification of the pixels corresponding to the areas 31 can also be done using a signal intensity map, where these pixels will have lower intensity due to the missing direct components. Confidence maps or noise maps can also be used to identify the pixels associated with the areas 31.

By referring to FIG. 3, for determining only the direct component 25 of the reflected light, for pixel 22 for instance, the complex value measured by the pixel 22 can be subtracted from the complex value measured by the pixel 23 to form a new complex value NC.

In an actual system there will be more than 2 pixels, and an indirect component function can be constructed by the samples taken on the areas 31. This indirect component function can then be interpolated for all pixels having both direct and indirect components and subtracted from these pixels, leaving only direct components.

When the scene is quite simple, and the reflectance of the scene ideal, the value associated to indirect components is a continuous function which can be easily sampled by all areas 31, because the indirect components originate from a Lambertian reflectance of the scene 24.

When the scene is more complex, the calculation may be performed differently. The scene 40 of FIG. 6 comprises for instance a first wall 43 with a door and a second wall 41, on which a cupboard 42, with a given depth, is mounted. In this example, indirect reflections originating from the reflection of the cupboard 42 or from the wall 43 do not lead to similar measurements. For determining the direct component of the reflected light, different spatial zones 45, 46 of light pattern on the scene 40 can be determined. For illustration purposes, different shapes have been used in FIG. 6, but it should be understood that both light sub-patterns 45 and 46 originate from the same patterning means 30 placed in front of the illumination unit 20 of the TOF camera system 10. The scene is now first segmented using the depth data available or any additional data useful for segmenting the scene. For each segment of the scene, again an continuous function can be associated with the indirect components, which can be sampled by the areas 31 belonging to each segment respectively. This indirection component function linked to each segment can then be used to compensate for the unwanted indirect components present in the pixels with both direct and indirect components.

The invention claimed is:

1. A method for measuring a distance between an object within a scene and a Time-Of-Flight camera system, and providing a depth map of the object, the Time-Of-Flight camera system comprising a light source, an imaging sensor having a matrix of pixels and an image processor, the method comprising:

modifying in a discrete way light output from said light source to form a pattern on the scene that illuminates elementary areas of the scene with different incident intensities;

receiving by the matrix of pixels of the imaging sensor, light reflected by said elementary areas of the scene and providing the image processor with data corresponding to the received reflected light, wherein the reflected light includes first reflected light associated with direct light beams incident on the scene and second reflected light associated with indirect light beams incident on the scene;

generating, based the data corresponding to the received reflected light, a first depth map;

determining a location of one or more peaks in the first depth map caused, at least in part, by the second reflected light;

determining, based on the determined location of one or more peaks in the first depth map, at least one pixel in the matrix of pixels that received exclusively or primarily only second reflected light; and processing the data corresponding to the received reflected light to generate a second depth map in which an influence of the indirect light beams incident on the scene on a depth map of the object has been reduced, wherein generating the second depth map comprises:

determining, based on the at least one determined pixel in the matrix of pixels that received exclusively or primarily only second reflected light, an indirect component function; and generating the second depth map by adjusting values in the data corresponding to the received reflected light based on the indirect component function.

2. The method of claim 1, wherein modifying the light output from said light source comprises arranging a mask between the light source and the scene.

3. The method of claim 2, wherein the first depth map and the second depth map are generated based on arranging a same mask between the light source and the scene.

4. The method of claim 1, wherein determining, based on the first depth map, at least one pixel in the matrix of pixels that received exclusively or primarily only second reflected light comprises determining at least one pixel that only received second reflected light.

5. The method according to claim 1, further comprising determining two different spatial zones of areas on the scene, associated with different sets of pixels of said matrix of pixels, respectively.

6. The method of claim 1, wherein generating the second depth map comprises subtracting data associated with the determined at least one pixel in the matrix of pixels that received exclusively or primarily only second reflected light from one or more other pixels in the matrix of pixels that received a combination of first reflected light and second reflected light.

7. A Time-Of-Flight (TOF) camera system for measuring a distance between an object within a scene and the TOF camera system, and providing a depth map of the object, the TOF camera system comprising:
a light source arranged to illuminate the scene with a pattern of modulated light;
an imaging sensor having a matrix of pixels arranged to receive light reflected by one or more objects in the scene when the scene is illuminated by the modulated light output form the light source, wherein the reflected light includes first reflected light associated with direct light beams incident on the scene and second reflected light associated with indirect light beams incident on the scene;
an image processor programmed to:
receive from the imaging sensor, data corresponding to the reflected light received by the matrix of pixels
generate, based on the data corresponding to the reflected light, a first depth map;
determine a location of one or more peaks in the first depth map caused, at least in part, by the second reflected light;
determine, based on the determined location of one or more peaks in the first depth map, at least one pixel in the matrix of pixels that received exclusively or primarily only secondary reflected light; and
process the data corresponding to the received reflected light to generate a second depth map in which an influence of the indirect light beams incident on the scene on a depth map of the object has been reduced, wherein generating the second depth map comprises:
determining, based on the at least one determined pixel in the matrix of pixels that received exclusively or primarily only second reflected light, an indirect component function; and
generating the second depth map by adjusting values in the data corresponding to the received reflected light based on the indirect component function.

8. The TOF camera system of claim 7, further comprising a mask associated with the light source to generate the pattern of modulated light.

9. The TOF camera system of claim 8, wherein the mask comprises a series of identical pattern groups.

10. The TOF camera system of claim 8, wherein the mask is configured such that the direct incident beams output from the light source impinge on particular areas of the scene.

11. The TOF camera system of claim 8, wherein the first depth map and the second depth map are generated based on associating a same mask with the light source.

12. The TOF camera system of claim 7, wherein generating the second depth map comprises-subtracting data associated with the determined at least one pixel in the matrix of pixels that received exclusively or primarily only second reflected light from one or more other pixels in the matrix of pixels that received a combination of first reflected light and second reflected light.

* * * * *